(12) United States Patent
Burns et al.

(10) Patent No.: US 7,270,309 B2
(45) Date of Patent: Sep. 18, 2007

(54) APPARATUS FOR MOUNTING A FLAT PANEL DISPLAY

(75) Inventors: Don R. Burns, Tustin Ranch, CA (US); John Silva, Cypress, CA (US); Glenn Hamilton, Huntington Beach, CA (US)

(73) Assignee: Vantage Point Products Corp., Santa Fe Springs, CA (US)

( * ) Notice: Subject to any disclaimer, the term of this patent is extended or adjusted under 35 U.S.C. 154(b) by 0 days.

(21) Appl. No.: 11/031,524

(22) Filed: Jan. 6, 2005

(65) Prior Publication Data

US 2005/0178941 A1  Aug. 18, 2005

Related U.S. Application Data

(60) Provisional application No. 60/535,703, filed on Jan. 8, 2004.

(51) Int. Cl.
*A47H 1/10* (2006.01)

(52) U.S. Cl. ............ 248/317; 248/220.21; 248/220.41; 248/220.43; 248/224.51; 248/224.61; 248/225.11; 248/223.41; 248/309.1; 248/682; 248/475.1; 248/489; 248/495; 211/162; 211/87.01; 211/90.01

(58) Field of Classification Search ............ 248/475.1, 248/489, 495, 220.21, 223.41, 224.51, 224.61, 248/225.11, 220.43, 220.41, 309.1, 317, 682; 211/162, 87.01, 106.01, 90.01; 40/606.01, 40/606.14, 606.15, 745, 761; 348/825

See application file for complete search history.

(56) References Cited

U.S. PATENT DOCUMENTS

| 5,224,610 | A  | * | 7/1993 | Veazey ..................... 211/87.01 |
| 5,904,328 | A  | * | 5/1999 | Leveridge et al. ....... 248/124.1 |
| 6,050,322 | A  | * | 4/2000 | Finkelstein et al. ......... 160/332 |
| 6,220,461 | B1 | * | 4/2001 | Dickinson ................ 211/90.01 |
| 7,066,435 | B2 | * | 6/2006 | Oddsen et al. ......... 248/220.43 |

* cited by examiner

*Primary Examiner*—Carl D. Friedman
*Assistant Examiner*—Todd M. Epps
(74) *Attorney, Agent, or Firm*—Fulbright & Jaworski LLP

(57) ABSTRACT

A mounting apparatus comprising a mounting bracket and a display bracket. The mounting bracket includes a first mounting plate and first and second seating flanges extending outwardly from the mounting plate. The first seating flange includes a first seating channel. The display bracket includes a display mounting surface and first and second mounting flanges. The display mounting surface is adapted to be affixed to a flat panel display. The first mounting flange is adapted to seat in the first seating channel. The second mounting flange is adapted to engage the second seating flange when the first mounting flange is seated in the first seating channel.

10 Claims, 8 Drawing Sheets

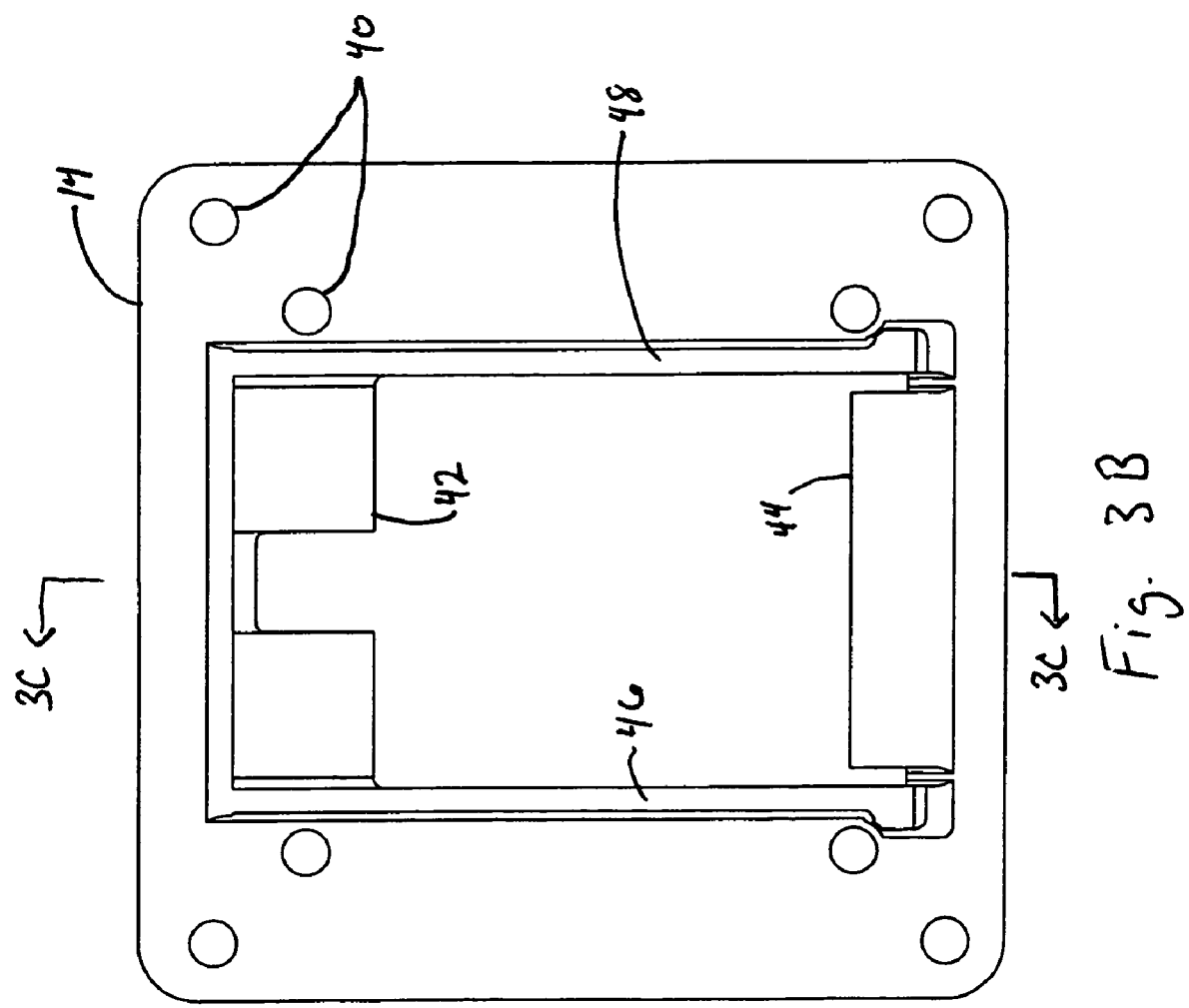

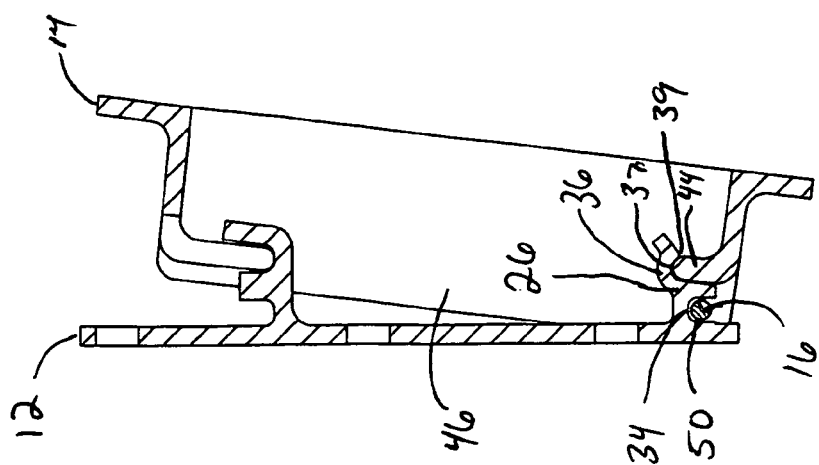
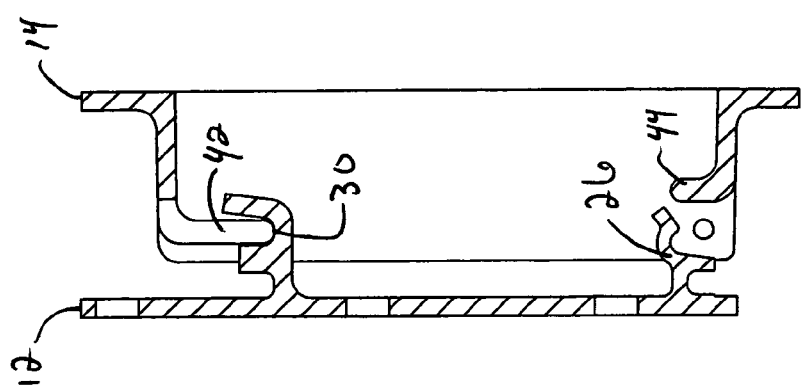
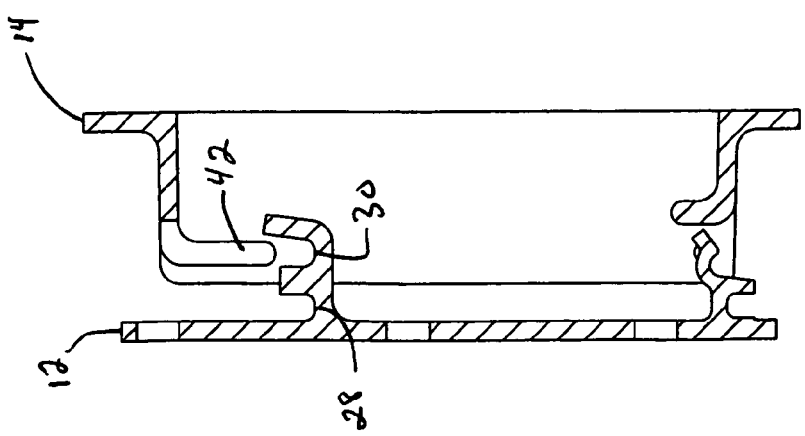

_US 7,270,309 B2_

APPARATUS FOR MOUNTING A FLAT PANEL DISPLAY

PRIORITY

Priority is claimed to U.S. provisional application Ser. No. 60/535,703, filed Jan. 8, 2004. The disclosure of this priority document is incorporated herein by reference.

BACKGROUND OF THE INVENTION

1. Field of the Invention

The field of the present invention is devices for mounting flat panel displays to vertical surfaces such as walls.

2. Background

Devices for mounting flat panel displays to vertical surfaces, such as walls, frequently have one or more shortcomings. Some are overly difficult to affix to the vertical surface and position the flat panel display thereon as desired. Others have too high of a profile and position the flat panel display too far away from the wall. Still others offer the user no choice in the viewing angle at which the flat panel display is mounted.

SUMMARY OF THE INVENTION

The present invention is directed toward a mounting apparatus for a flat panel display. The mounting apparatus comprises a mounting bracket and a display bracket. The mounting bracket includes a mounting plate and two seating flanges extending outwardly therefrom. The first of these seating flanges includes a seating channel. The display bracket includes a display mounting surface to which a flat panel display may be affixed and two mounting flanges. The first of these mounting flanges is adapted to seat in the seating channel. The second of the mounting flanges is adapted to engage the second seating flange when the first mounting flange is seated in the seating channel.

Optionally, the first seating flange may include more than one seating channel, and the first mounting flange may be selectively seated in either of the seating channels. Inclusion of multiple seating channels provides the option of placing the display mounting surface at an angle to the mounting plate. Regardless of the seating channel in which the first mounting flange is seated, the second mounting flange is adapted to engage the second seating flange when the first mounting flange is seated.

As a further option, the second seating flange may include a lock channel and the display bracket may include at least one sidewall with a hole that aligns with the lock channel when the display bracket engages the mounting bracket. A pin may be inserted through the hole and at least partially into the lock channel to better secure the display bracket to the mounting bracket.

Accordingly, the present invention provides an improved apparatus for mounting a flat panel display. Other objects and advantages will appear hereinafter.

BRIEF DESCRIPTION OF THE DRAWINGS

In the drawings, wherein like reference numerals refer to similar components:

FIGS. 3A-3C illustrate various views of the display bracket shown in FIG. 1;

FIGS. 5A-5C illustrate the process of engaging the display bracket to the mounting bracket.

DETAILED DESCRIPTION OF THE PREFERRED EMBODIMENTS

Figure 1:
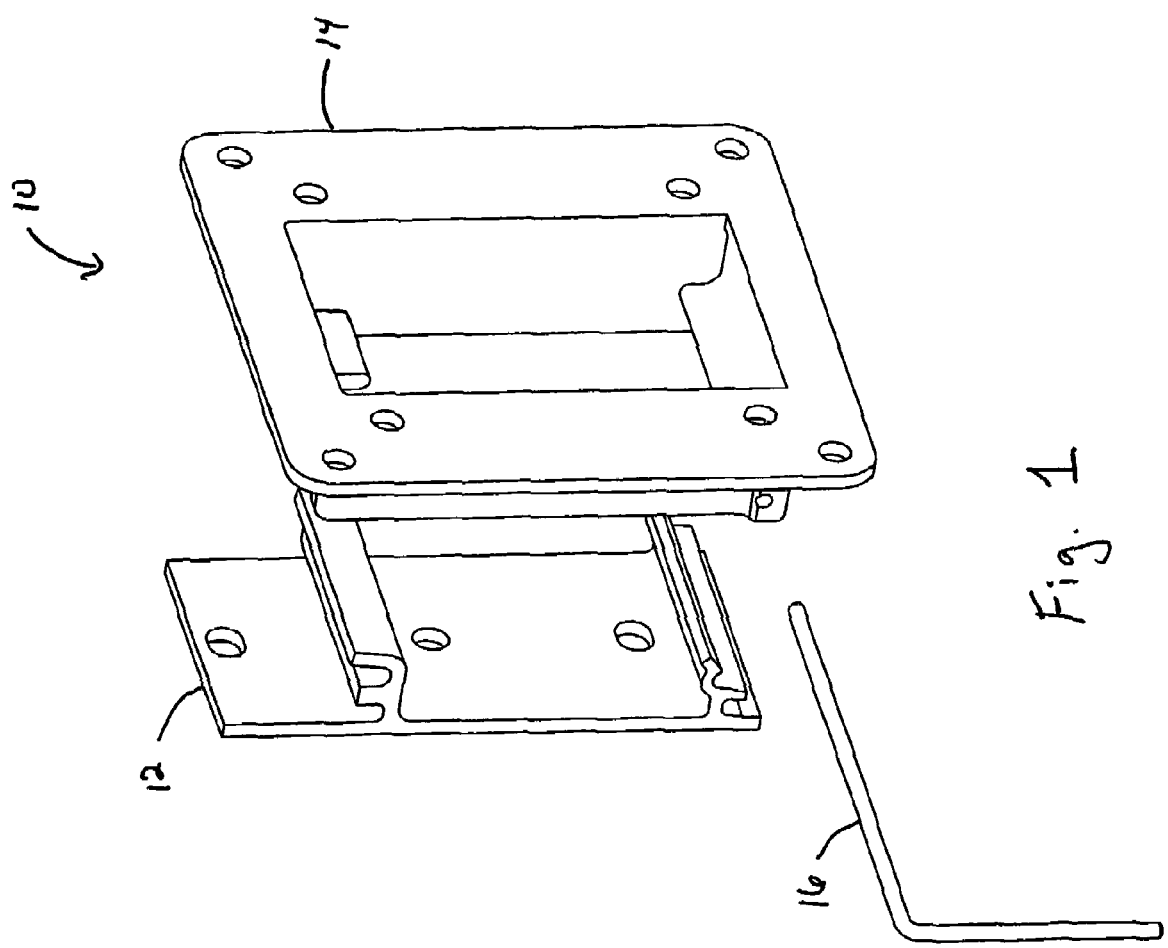
FIG. 1 is an exploded view of an apparatus for mounting a flat panel display.
Figure 2B:
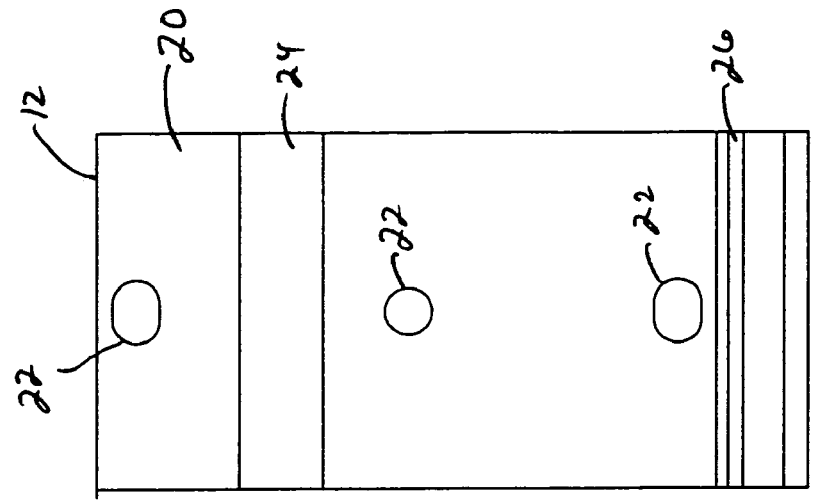
FIGS. 2A-2C illustrate various views of the mounting bracket shown in FIG. 1.
Figure 2A:
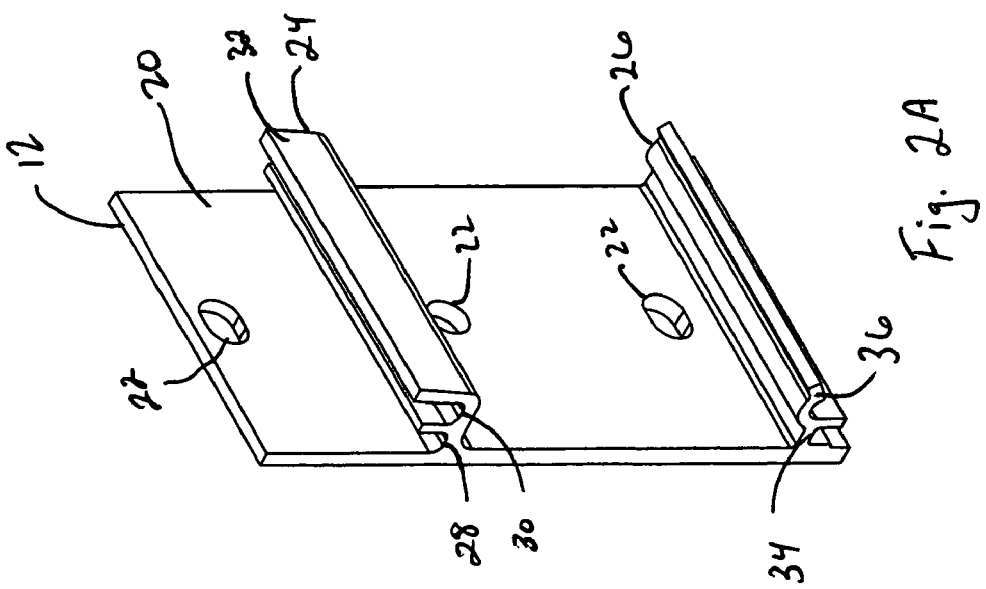
Figure 2C:
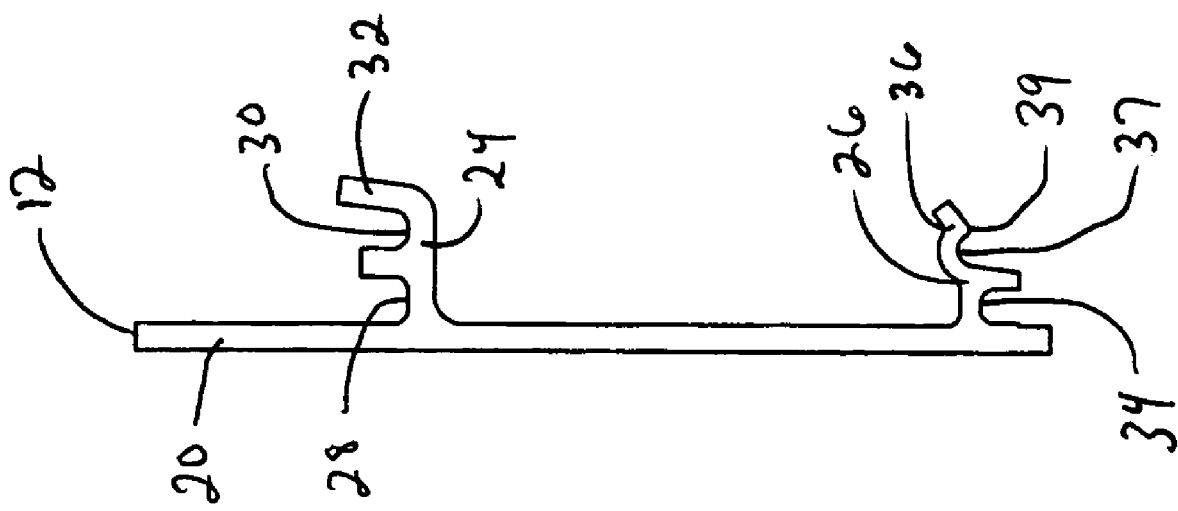

Turning in detail to the drawings, FIG. 1 illustrates an apparatus 10 for mounting a flat panel display (not shown) to a vertical surface. The apparatus 10 includes a mounting bracket 12, a display bracket 14, and a pin 16. Referring to FIGS. 2A-2C, the mounting bracket 12 includes a mounting plate 20 and holes 22 therethrough for securing the mounting bracket 12 to a vertical surface. Upper and lower seating flanges 24, 26 extend outward from the mounting plate 20. The upper seating flange 24 includes two U-shaped seating channels 28, 30. The first seating channel 28 is immediately adjacent the mounting plate 20. This first seating channel 28 is also disposed between the second seating channel 30 and the mounting plate 20. The outer wall 32 of the second seating channel 30 is angled outward from the mounting bracket 12. As is best seen in FIG. 2C, preferably the outward angle of the outer wall 32 is approximately 7.5°, although it may be more or less as is appropriate. The lower seating flange 26 includes an inverted U-shaped lock channel 34 adjacent the mounting plate 20. The distal end of the lower seating flange 26 extends beyond the lock channel 34 to form a shelf 36 having a seating portion 37 and a downwardly curved portion 39. Both seating channels 28, 30 and the shelf 36 provide seats for engaging the display bracket.

Figure 3A:
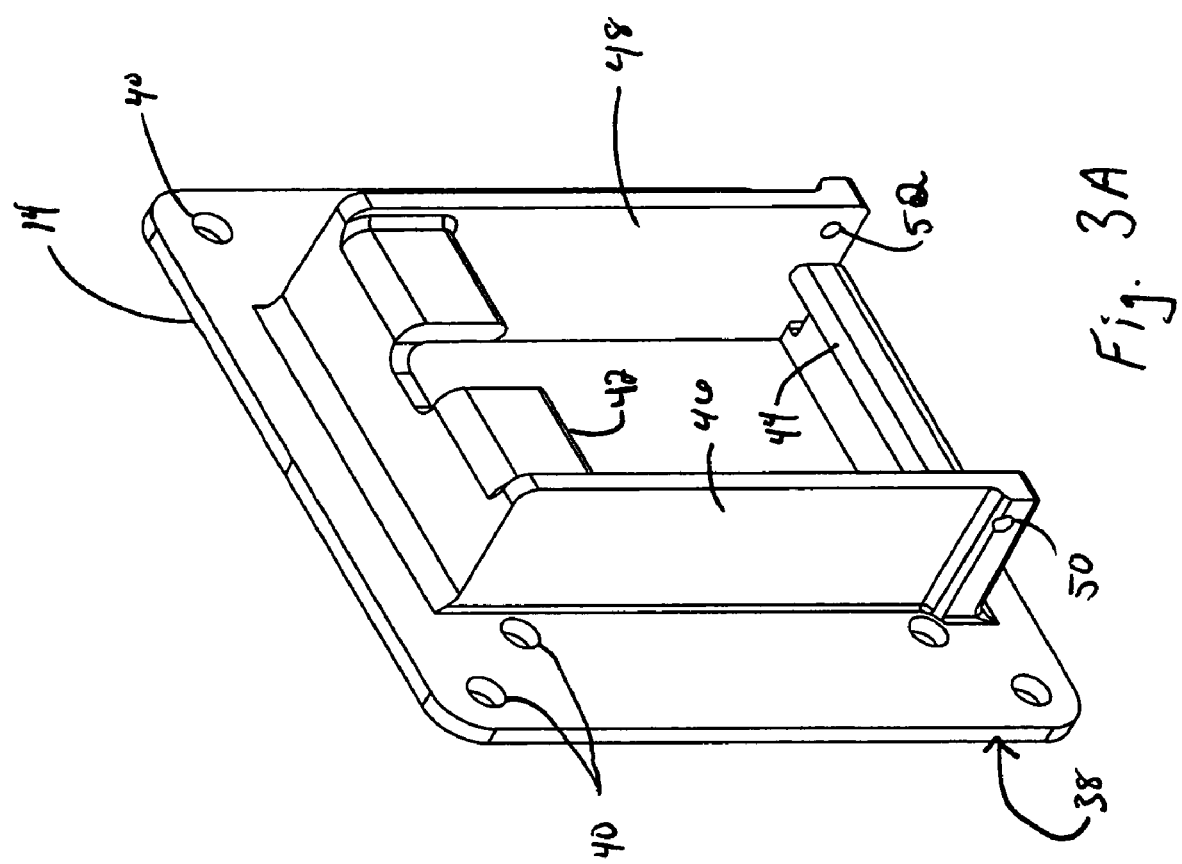
Figure 3C:
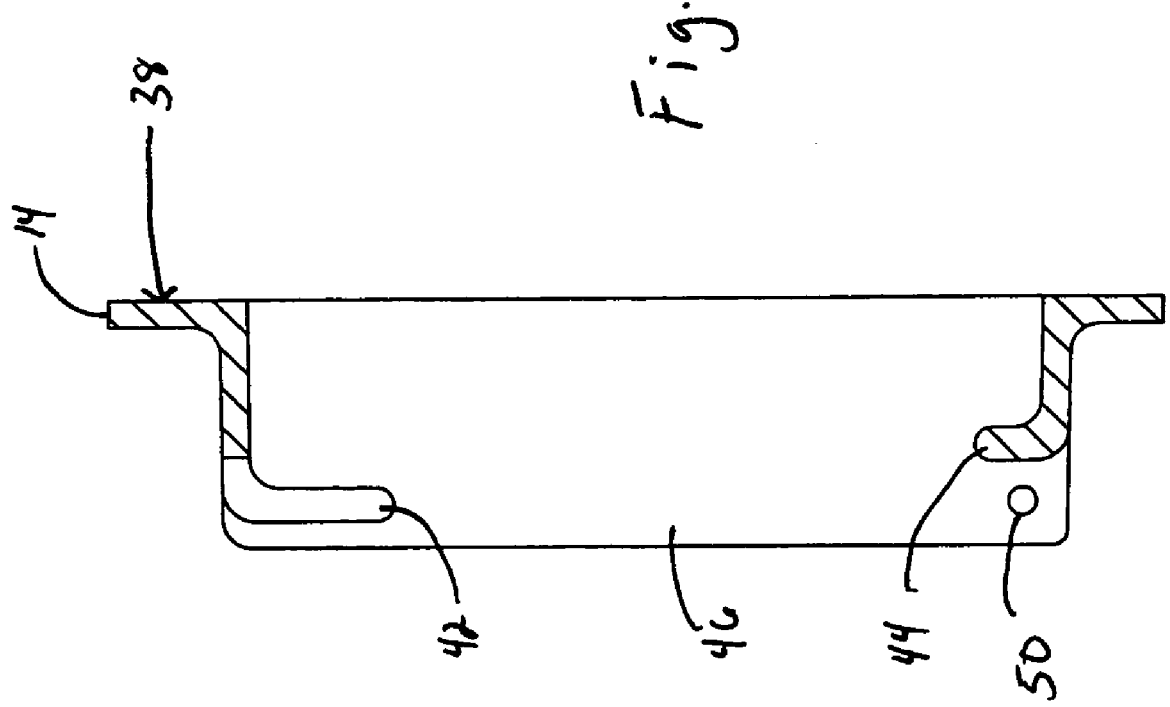

Turning to the display bracket 14 illustrated in FIGS. 3A-3C, the display mounting surface 38 of the display bracket 14 includes holes 40 therethrough for securing the display bracket 14 to a flat panel display. Preferably, the display mounting surface 38 includes at least two sets of four holes each which allow the display bracket 14 to be secured to different sizes of flat panel displays. The display bracket 14 also includes an upper mounting flange 42 and a lower mounting flange 44, each disposed between two sidewalls 46, 48. The gap between the sidewalls 46, 48 is approximately equal to the width of the mounting bracket. The upper mounting flange 42 is offset from the display mounting surface 38 and extends in a generally downward direction. In the embodiment shown, the upper mounting flange 42 is divided into two sections. In practice, however, the upper mounting flange 42 may be unitary. The lower mounting flange 44 is also offset from the display mounting surface 38, and it extends in a generally upward direction. As can be seen in FIG. 3C, the offset of the lower mounting flange 44 is less than the offset of the upper mounting flange 42. Each sidewall 46, 48 includes a hole 50, 52 disposed near the lower mounting flange 44. These holes 50, 52 are alignable with the lock channel of the mounting plate and enable the pin to be inserted into the lock channel to better secure the display bracket to the mounting bracket.

Figure 4B:
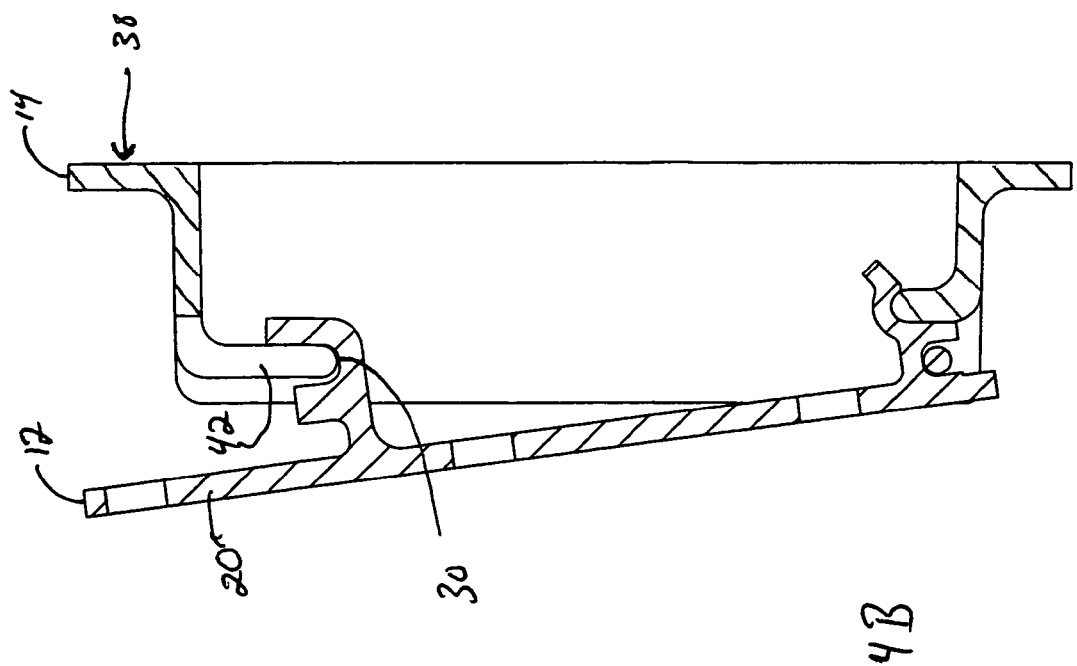
FIGS. 4A and 4B illustrate two configurations for engaging the mounting bracket and the display bracket.
Figure 4A:
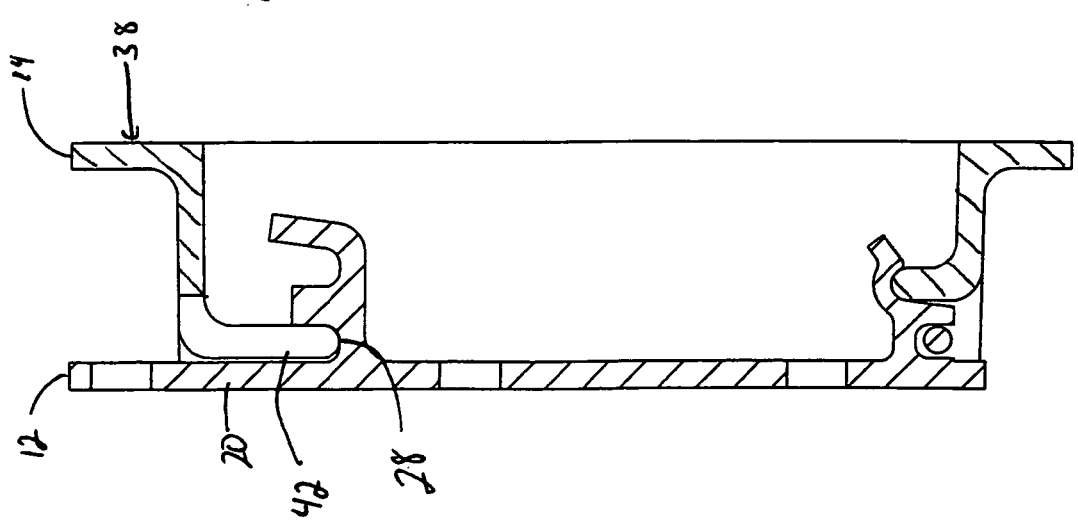

FIG. 4A shows the upper mounting flange 42 of the display bracket 14 seated in the first seating channel 28 of the mounting bracket 12. In this configuration, the display mounting surface 38 is parallel to the mounting plate 20. FIG. 4B shows the upper mounting flange 42 of the display bracket 14 seated in the second seating channel 30 of the mounting bracket 12. In this configuration, the display mounting surface 38 is set at approximately a 7.5° angle to the mounting plate 20 (and thus to any vertical surface to which the mounting plate is affixed). Those skilled in the art will appreciate that the offset of the second seating channel 30 from the mounting plate 20 controls the angle at which the display mounting surface 38 is set relative to the mounting plate 20.

FIGS. 5A-5C illustrate the process of engaging the display bracket 14 with the mounting bracket 12. Referring to FIG. 5A, with the mounting bracket 12 secured to a vertical surface (not shown), the upper mounting flange 40 of the display bracket 14 is seated into one of the two seating channels 28, 30 of the upper seating flange 24; in this case, the second seating channel 30 is selected. FIG. 5B shows the upper mounting flange 40 seated in the second seating channel 30, prior to the lower mounting flange 44 engaging the second seating flange 26. Referring to FIG. 5C, the lower portion of the display bracket 14 is pushed toward the mounting bracket 12 to engage the lower mounting flange 44 with the shelf 36 of the lower seating flange 26. Upon initial engagement, the lower mounting flange 44 causes the shelf 36 to flex upward as the lower mounting flange 44 passes the downwardly curved portion 39 of the shelf 36 and engages the seating portion 37. The pin 16 may thereafter be inserted into the lock channel 34 through the hole 50 in the sidewall 46 of the display bracket 14 to secure the display bracket 14 to the mounting bracket 12.

Thus, an improved apparatus for mounting flat panel displays is disclosed. While embodiments of this invention have been shown and described, it will be apparent to those skilled in the art that many more modifications are possible without departing from the inventive concepts herein. The invention, therefore, is not to be restricted except in the spirit of the following claims.

What is claimed is:

1. A mounting apparatus comprising:
a mounting bracket including a mounting plate and first and second seating flanges extending outwardly from the mounting plate, the first seating flange including a first seating channel, the second seating flange includes a lock channel; and
a display bracket including a display mounting surface and first and second mounting flanges, wherein the display mounting surface is adapted to be affixed to a flat panel display, the first mounting flange is adapted to seat in the first seating channel, and the second mounting flange is adapted to engage the second seating flange when the first mounting flange is seated in the first seating channel, and the display bracket includes at least one sidewall adapted to extend alongside the seating flanges, the sidewall including at least one hole which is alignable with the lock channel, when the display bracket engages the mounting bracket.

2. The mounting apparatus of claim 1, further including a pin adapted to be at least partially inserted into the lock channel through the at least one hole in the sidewall.

3. A mounting apparatus comprising:
a mounting bracket including a mounting plate and first and second seating flanges extending outwardly from the mourning plate, the first seating flange including first and second seating channels, the first seating channel is adjacent the mounting plate and is disposed between the mounting plate and the second seating channel; and
a display bracket including a display mounting surface and first and second mounting flanges, the second mounting flange including a lock channel, wherein the display mounting surface is adapted to be affixed to a flat panel display, the first mounting flange is adapted to seat in one of the first seating channel or the second seating channel, and the second mounting flange is adapted to engage the second seating flange when the first mounting flange is seated in the first seating channel or the second seating channel, the display bracket further includes at least one sidewall adapted to extend alongside the second seating flange, the sidewall including at least one hole which is alignable with the lock channel, when the display bracket engages the mounting bracket.

4. A mounting apparatus comprising:
a mounting bracket including a mounting plate and first and second seating flanges extending outwardly from the mounting plate, the first seating flange including first and second seating channels, wherein the first seating channel is adjacent the mounting plate and is disposed between the mounting plate and the second seating channel and the second seating flange includes a lock channel;
a display bracket including a display mounting surface and first and second mounting flanges, wherein the display mounting surface is adapted to be affixed to a flat panel display, the first mounting flange is adapted to seat in one of the first seating channel or the second seating channel, and the second mounting flange is adapted to engage the second seating flange when the first mounting flange is seated in the first seating channel or the second seating channel, wherein the display bracket includes at least one sidewall adapted to extend alongside the second seating flange, the sidewall including at least one hole which is alignable with the lock channel, when the display bracket engages the mounting bracket; and
a pin adapted to be at least partially inserted into the lock channel through the at least one hole in the sidewall.

5. A mounting apparatus comprising:
a mounting bracket including a mounting plate and first and second seating flanges extending outwardly from the mounting plate, the second seating flange includes a lock channel; and
a display bracket including a display mounting surface, means to suspend the display bracket from the first seating flange and means to engage the second seating flange when the display is suspended from the first seating flange, wherein the display mounting surface is adapted to be affixed to a flat panel display, the display bracket includes at least one sidewall adapted to extend alongside the second seating flange, the sidewall including at least one hole which is alignable with the lock channel, when the display bracket engages the mounting bracket.

6. A mounting apparatus comprising:
a mounting bracket including a mounting plate and first and second seating flanges extending outwardly from the mounting plate, the first seating flange including first and second seating channels;
a display bracket including a display mounting surface and first and second mounting flanges, the second mounting flange including a lock channel, wherein the display mounting surface is adapted to be affixed to a flat panel display, the first mounting flange is adapted to seat in one of the first seating channel or the second seating channel, and the second mounting flange is adapted to engage the second seating flange when the first mounting flange is seated in the first seating channel or the second seating channel, a sidewall disposed adjacent said second seating flange and defining at least one hole therethrough; and a pin adapted to be at least partially inserted into the look channel through the at least one hole in the sidewall.

7. A mounting apparatus comprising:

a mounting bracket including a mounting plate and first and second seating flanges extending outwardly from the mounting plate, the first seating flange including a first seating channel, the second seating flange includes a lock channel; and a display bracket including a display mounting surface and first and second mounting flanges, wherein the display mounting surface is adapted to be affixed to a flat panel display, the first mounting flange is adapted to seat in the first seating channel, and the second mounting flange is adapted to engage the second seating flange when the first mounting flange is seated in the first seating channel, and means for engaging said display bracket and said lock channel to secure said display bracket to said mounting bracket wherein the display bracket includes at least one sidewall adapted to extend alongside the second seating flange, the side wall including at least one hole which is alignable with the lock channel, when the display bracket engages the mounting bracket.

8. The mounting apparatus of claim 7, wherein the first and second mounting flanges extend in opposing directions.

9. The apparatus of claim 7, wherein the display mounting surface is disposed at an angle to the mounting plate when the display bracket engages the mounting bracket.

10. The mounting apparatus of claim 8, wherein said means for engaging a pin adapted to be at least partially inserted into the lock channel through the at least one hole in the sidewall.

* * * * *